United States Patent [19]

Tago

[11] Patent Number: 4,636,712

[45] Date of Patent: Jan. 13, 1987

[54] REDUCED POWER DISPLACEMENT CONVERTING DEVICE USING VARIABLE CAPACITANCE INPUT

[75] Inventor: Keiichiro Tago, Kanagawa, Japan

[73] Assignee: Fuji Electric Company, Ltd., Kawasaki, Japan

[21] Appl. No.: 706,093

[22] Filed: Feb. 27, 1985

[30] Foreign Application Priority Data

Feb. 28, 1984 [JP] Japan .............................. 59-28126[U]
Mar. 13, 1984 [JP] Japan .............................. 59-35730[U]

[51] Int. Cl.$^4$ ............................................... G01L 9/12
[52] U.S. Cl. ................................. 323/349; 324/60 R; 73/718; 73/724
[58] Field of Search ....................... 323/349, 350, 352; 324/60 R, 60 C; 73/718, 724, 862.52

[56] References Cited

U.S. PATENT DOCUMENTS

| 4,272,822 | 6/1981 | Yasuhara et al. | 73/718 X |
| 4,357,834 | 11/1982 | Kimura | 73/724 X |
| 4,387,601 | 6/1983 | Azegami | 324/60 R |
| 4,389,646 | 6/1983 | Tago | 324/60 R |

Primary Examiner—Peter S. Wong
Attorney, Agent, or Firm—Finnegan, Henderson, Farabow, Garrett & Dunner

[57] ABSTRACT

A displacement converting device converts mechanical movement of a sensor or actuator mechanisms to a corresponding electrical signal by varying the electrostatic capacitance of one or a combination of capacitors in accordance with the mechanical movement. Current generating circuits produce currents having magnitudes corresponding to the capacitance values. An operational amplifier generates an output signal having a value corresponding to the mechanical movement by comparing the magnitudes of the generated currents.

14 Claims, 2 Drawing Figures

REDUCED POWER DISPLACEMENT CONVERTING DEVICE USING VARIABLE CAPACITANCE INPUT

FIELD OF THE INVENTION

The present invention relates to a displacement converting circuit device in which mechanical displacement such as displacement of a movable electrode due to fluid pressure or the like, is detected as a change in electrostatic capacity, and the change is converted into an electric signal which is in turn transmitted to a receiving measurement instrument, and particularly to a converting device with low power consumption.

BACKGROUND OF THE INVENTION

It is known in a converting device in which a process quantity, such as pressure or the like, is converted into an electric signal and the electric signal is subsequently transmitted, to use DC current signals of 4–20 mA or 10–50 mA. These signal levels are widely employed because the converted signal is less affected by induced noise voltages and can be transmitted over a long distance. Generally, the receiving measurement instrument for receiving the above-mentioned current signal is arranged such that the current signal is converted into a DC voltage signal of 1–5 volts by a fixed resistor connected in series with the signal transmission line and then the voltage signal is received. The power consumption is normally several hundred mW or more in such a converting device of a current signal transmission system.

There have been many cases where it is required to locate the converting devices in distant places as the area of process control become widespread. In such cases, if the converting device is driven by a commercial power source, it becomes necessary to construct a power line from the commercial power source to the distant areas. Alternately, if the converting device is arranged to be driven by a battery, the power consumption is large and battery maintenance work, such as charging, etc., becomes quite troublesome. These problems are common particularly in converting devices for detecting mechanical displacements and converting the detected values into electric signals representing flow rate, pressure, and other variables widely used for process control.

OBJECTS AND SUMMARY OF THE INVENTION

It is an object of the present invention to provide a displacement converting device having low power consumption.

Another object of the present invention is a displacement converting device suitable for use in areas remote from receiving measurement instruments.

A further object of the present invention is a reliable, low-maintenance displacement converting device; and Still another object of the present invention is a displacement converting device which measures physical condition changes as variations in electrostatic capacitance.

These and other objects are attained by a displacement converting device for converting the mechanical movement of a sensor or actuator mechanism to a corresponding output signal, comprising a source of DC voltage, means for producing an AC voltage from the DC voltage, a first capacitor, a second capacitor having a variable capacitance corresponding to the mechanical movement of the mechanism, a first current circuit connected to the producing means and to the first capacitor for producing a first current proportional to the capacitance of the first capacitor, a second current circuit connected to the producing means and to the second capacitor for producing a second current proportional to the capacitance of the second capacitor, and an operational amplifier having a first input terminal for receiving a first signal corresponding to the magnitude of the first current, a second input terminal for receiving a second signal corresponding to the magnitude of the second current, and an output terminal, the amplifier for comparing the first signal to the second signal and for generating the output signal having a magnitude corresponding to the displacement of the mechanism.

BRIEF DESCRIPTION OF THE DRAWINGS

These and other other objects, features, and advantages of the present invention will become more apparent from the following detailed description when it considered in view of the drawings, wherein.

DETAILED DESCRIPTION

Figure 1:
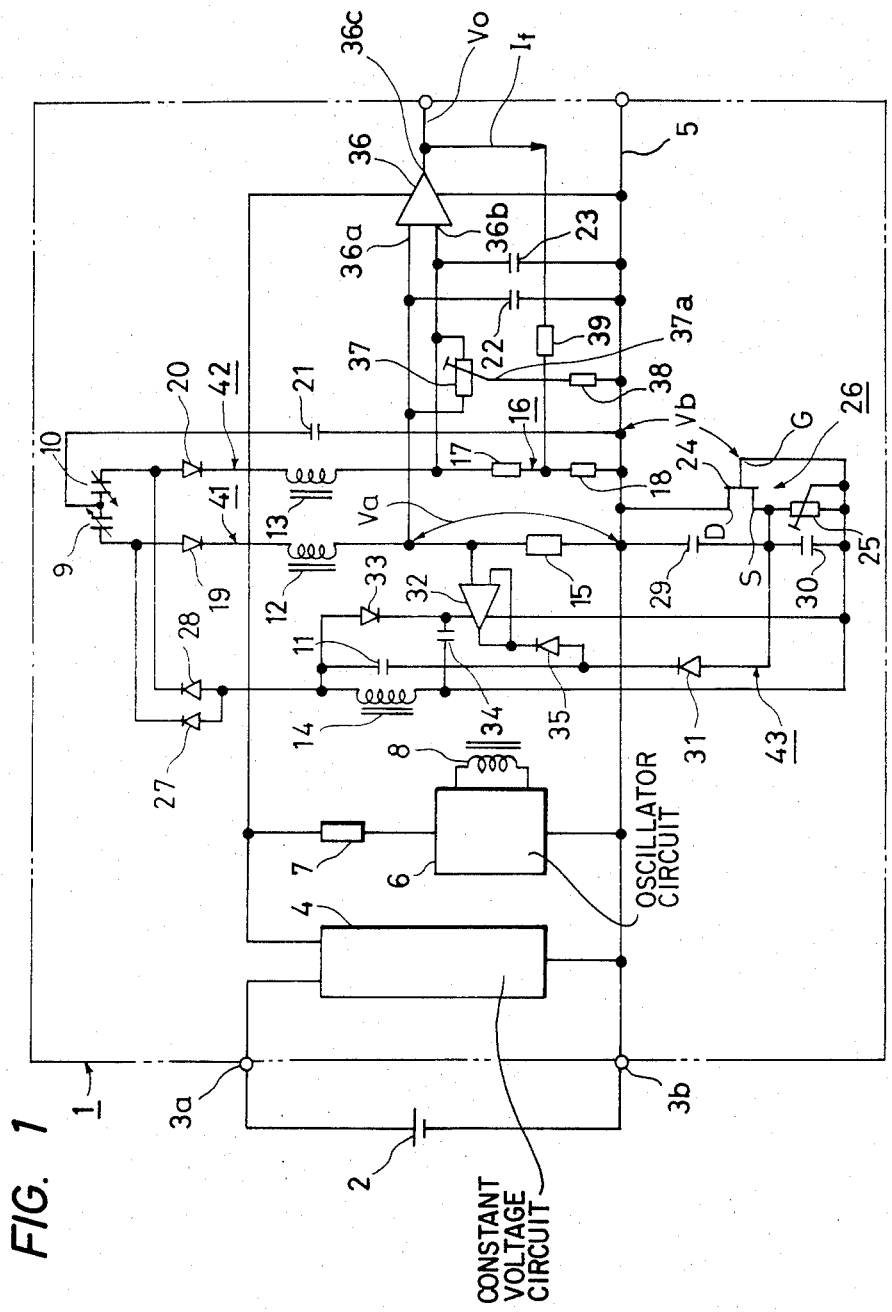
FIG. 1 is a circuit diagram of a first embodiment of the displacement converting device of the present invention.

FIG. 1 is a circuit diagram of an embodiment of the displacement converting device 1 of the present invention. Power supply terminals 3a, 3b of the displacement converting device 1 are connected with an external DC supply 2 such as a solar battery or the like, and to a constant voltage circuit 4 for generating a constant voltage. The negative pole of the constant voltage circuit 4 is connected to a reference potential portion 5.

An oscillation circuit 6 is driven by the application of the output voltage of the constant voltage circuit 4 through a resistor 7 and generates an AC voltage that is applied to a primary coil 8 of a coupling coil. The resistor 7 is provided for adjusting the amplitude of the AC voltage by changing the resistance value thereof.

Each of a first capacitor element 9 and a second capacitor element 10 has a pair of fixed electrodes and a movable electrode disposed between the fixed electrodes for detecting the difference between two pressures. Each capacitor element is arranged such that the electrostatic capacitance between the movable electrode and each of the fixed electrodes are changed differentially with each other in response to the above-mentioned pressure difference. This is accomplished by the movable electrode being displaced by a mechanism (not shown). A third capacitor element 11 is provided in which the electrostatic capacities set by a method described later.

Secondary coils 12, 13, 14 are individually coupled with the primary coil 8 for generating AC voltages of equal amplitudes. A first resistor 15 is connected between the secondary coil 12 and the reference potential portion 5, and a series circuit 16, comprising a second resistor 17 and a third resistor 18, is connected between the secondary coil 13 and the reference potential portion 5.

The secondary coil 12 and the first capacitor element 9 are connected to each other through a diode 19 with the secondary coil 12 being disposed at the cathode side of the diode 19. The secondary coil 13 and the second capacitor element 10 are connected to each other through a diode 20 with the secondary coil 13 being disposed at the cathode side of the diode 20. The respective electrodes of the capacitor elements 9 and 10 at the respective sides not connected to the diodes 19 and 20, respectively, are commonly connected to the reference potential portion 5 through a coupling capacitor 21. Smoothing capacitors 22 and 23 are connected in parallel with the first resistor 15 and with the series circuit 16, respectively.

A field effect transistor 24 has a drain D and a source S which are connected to the reference potential portion 5 and to a current regulating variable resistor 25, respectively. The gate G of the transistor 24 is connected to the source S through the variable resistor 25 as well as to one side of the secondary coil 14 that is in turn connected at its other end to the anode of the diode 19 through a diode 27 as well as to the anode of the diode 20 through a diode 28. The diodes 27 and 28 are forwardly connected to the diodes 19 and 20, respectively. Smoothing capacitors 29 and 30 are provided.

A diode 31 has its anode connected to the source S of the transistor 24. The third capacitor element 11 is connected between the cathode of the diode 31 and the respective anodes of the diodes 27 and 28. A buffer amplifier 32 is driven by a DC voltage obtained by rectifying an AC voltage generated in the secondary coil 14 through a diode 33 and a smoothing capacitor 34. One of the two input terminals of the buffer amplifier 32 is connected to a junction between the first resistor 15 and the secondary coil 12, and the other input terminal is connected to the output terminal of the same amplifier 32. The output terminal of this buffer amplifier is also connected to the cathode of a diode 35 which is in turn forwardly connected to the cathode of the diode 31.

An operational amplifier 36 is driven by the output voltage of the constant voltage circuit 4 and has first and second input terminals 36a and 36b connected to a junction between the first resistor 15 and the secondary coil 12 and a junction between the second resistor 17 and the secondary coil 13, respectively. A variable resistor 37 having an adjustable terminal 37a is connected to the reference potential portion 5 through a resistor 38. the variable resistor 37 has opposite end side terminals connected to the first and second input terminals 36a and 36b. A fourth resistor 39 is connected at one end to an output terminal 36c of the operational amplifier 36 and at its other end to a junction between the second resistor 17 and the third resistor 18. The displacement converting device 1 is constituted by those components as described above except the external DC supply 2.

In the displacement converting device 1, an AC voltage is induced in each of the secondary coils 12, 13, and 14 when the DC supply 2 is connected to the device 1. The secondary coils 12, 13 and 14 are arranged such that the respective polarities of the induced voltages are directed in the same direction at the same time. Therefore, during the period of a positive half-wave in which the voltage induced in the secondary coil 12 is directed downwardly, the current due to this voltage flows successively through the secondary coil 12, a parallel circuit composed of the first resistor 15 and the capacitor 22, the coupling capacitor 21, the first capacitor element 9, and the diode 19.

During the period of the same positive half-wave, the current due to the voltage induced in the secondary coil 13 flows successively through the secondary coil 13, a parallel circuit composed of the series circuit 16 and the capacitor 23, the coupling capacitor 21, the second capacitor element 10, and the diode 20. During the following next half-wave period, that is during a negative half-wave period where the voltage induced in the secondary coil 14 is directed in the opposite direction, the current passes through the secondary coil 14 and then to the diodes 27 and 28.

The current flowing through the diode 27 flows into the coupling capacitor 21 through the first capacitor element 9, while the current flowing through the diode 28 flows into the coupling capacitor 21 through the second capacitor element 10. After passing through the capacitor 21, the two currents flow successively through a parallel circuit composed of the transistor 24 and the capacitor 29, and another parallel circuit composed of the variable resistor 25 and the capacitor 30.

When the voltage induced in the secondary coil 12 becomes directed downwardly, the current flowing through the first resistor 15 by the smoothing capacitor 22 generates a voltage drop across the ends of the resistor 15. At the same time, the current flowing through the second capacitor element 10 due to the voltage induced in the secondary coil 13 is rectified by the smoothing capacitor 23 in the series circuit 16, so that a voltage drop is generated across the opposite terminals of the series circuit 16.

When the voltage induced in the secondary coil 14 becomes directed upwardly, the currents caused to flow through the first and the second capacitor elements 9 and 10 generate a potential difference $V_b$ between the drain D and the gate G of the transistor 24 owing to the existence of the smoothing capacitors 29 and 30.

Current flows into the third capacitor element 11 due to the voltage induced in the secondary coil 14 as follows. When the voltage induced in the secondary coil 14 is directed downwardly, the current due to this voltage flows successively through the coil 14 and a parallel circuit composed of the variable resistor element 25. When the voltage induced in the secondary coil 14 is directed upwardly, this current due to the voltage flows successively through the coil 14, the third capacitor element 11, the diode 35, the buffer amplifier 32, and a junction between the variable resistor 25 and the gate G of the transistor 24. Therefore, a current which is the sum of the respective currents flowing through the first and second capacitor elements 9 and 10 from the secondary coil 14 flows downwardly through the variable resistor 25, and the current flowing through the third capacitor element 11 from the secondary coil 14 flows upwardly through the same variable resistor.

Since the variable resistor 25 and the transistor 24 are connected with each other in the manner described above, the composite current is the sum of the upwardly and downwardly flowing currents and is automatically controlled to be a predetermined value by the transistor 24. The result is that the potential difference $V_b$ becomes a predetermined value.

A control circuit 26 constituted by the transistor 24 and the variable resistor 25 is provided for performing the operations as described above. Since the control circuit 26 is arranged in a manner as described above, with the composite current flowing through the variable resistor 25, the whole current consumption in the circuit can be adjusted to be under an allowable value of the power supply 2.

In the operational amplifier 36, the output and input terminals thereof are connected to the respective portions as described above, so that if the voltage applied to the first input terminal 36a is different from that applied to the second input terminal 36b, a feedback current $I_f$ from the output terminal 36c flows into the reference potential portion 5 successively through the fourth resistor 39 and the third resistor 18. As a result, when the voltage respectively applied to the input terminals 36a and 36b and equal with each other, the output voltage produced at the output terminal 36c becomes $V_o$ in its equilibrium state.

Next, description will be made as to the magnitude of this output voltage, $V_o$. The respective voltages applied to the first and second capacitor elements 9 and 10 through the period of one cycle of the AC voltage of multi-amplitudes E induced across each of the secondary coils 12 and 13 are AC voltages respectively having equivalent multi-amplitudes the magnitude of which is $E-(V_a+V_b)$ if the voltage drop across the coupling capacitor 21 is neglected. Further, the voltage applied to the third capacitor element 11 through the period of one cycle of the AC voltage of the multi-amplitudes E induced across the secondary coil 14 is $E-(V_a+V_{ds})$, where $V_{ds}$ represents the voltage across the drain and source of the transistor 24. Since $V_{ds} \approx V_b$, the multiamplitudes of the AC voltage applied to the capacitor element 11 is considered to be equal to $E-(V_a+V_b)$. Accordingly, the respective magnitudes $I_1$ and $I_2$ of the currents flowing through the first resistor 15 and the series circuit 16 from the secondary coils 12 and 13, respectively, and the magnitude $I_3$ of the current flowing through the variable resistor 25 upwardly in the drawing from the secondary coil 14 are expressed by the following expressions:

$$I_1 = f \cdot [E - (V_a + V_b)] \cdot C_1 \quad (1)$$

$$I_2 = f \cdot [E - (V_a + V_b)] \cdot C_2$$

$$I_3 = f \cdot [E - (V_a + V_b)] \cdot C_3$$

where f represents the frequency of the voltage induced in the secondary coils 12, 13, and 14, and $C_1$, $C_2$, and $C_3$ represent the electrostatic capacities of the first, second and third capacitor elements, respectively.

The DC current flowing through the first resistor 15 is a first DC current having the magnitude $I_1$ proportional to the electrostatic capacity $C_1$ of the first capacitor element 9, and the DC current having the magnitude $I_2$ proportional to the electrostatic capacity $C_2$ of the second capacitor element 10. First and second current circuits 41, 42, driven by the AC voltages induced in the secondary coils 12, 13, and 14, produce the first and second DC currents as described above. The DC current flowing upwardly through the variable resistor 25 is a third DC current having the magnitude $I_3$ proportional to the electrostatic capacity $C_3$ of the third capacitor element 11. A third current circuit 43 is driven by the AC voltage induced in the second coil 14 to generate a third DC current.

The current caused to flow by the second coil 14 into the transistor 24 is the sum of the discharge currents of the first and second capacitor elements 9 and 10 charged by the currents $I_1$ and $I_2$ and therefore equals the sum, $I_1+I_2$. The magnitude of the current flowing through the variable resistor 25 is $I_1+I_2-I_3$. Since the control circuit 26 controls the magnitude of this current of the variable resistor 25 to be a constant value $I_k$, the following expression (2) is satisfied and the expression (3) is derived from the expressions (1) and (2).

$$I_1 + I_2 - I_3 = I_k \quad (2)$$

$$\left. \begin{array}{l} I_1 = I_k \cdot [C_1/(C_1 + C_2 - C_3)] \\ I_2 = I_k \cdot [C_2/(C_1 + C_2 - C_3)] \end{array} \right\} \quad (3)$$

Further, since the output voltage $V_o$ of the operational amplifier 36 assumes the equilibrium state under the condition of input/output voltages as described above, the following expressions (4) and (5) are established.

$$V_o = I_2 R_3 + I_f(R_3 + R_4) \quad (4)$$

$$I_1 \cdot R_1 = I_2 \cdot (R_2 + R_3) + I_f R_3 \quad (5)$$

where $R_1$, $R_2$, $R_3$, and $R_4$ represent the resistance values of the first, the second, the third, and the fourth resistors 15, 17, 18, and 39, respectively.

In FIG. 1, the arrangement is made such that $R_1 = R_2 + R_3 = R$, so that the following expression (6) is derived from the expressions (4) and (5) and the expression (7) is derived from the expressions (6) and (3).

$$V_o = I_2 \cdot R_3 + (R_3 + R_4) \cdot (R/R_3) \cdot (I_1 - I_2) \quad (6)$$

$$V_o = I_2 \cdot R_3 + (R_3 + R_4) \cdot (R/R_3) \cdot I_k \cdot \frac{C_1 - C_2}{C_1 + C_2 - C_3} \quad (7)$$

The electrostatic capacities $C_1$ and $C_2$ are obtained by the following expressions (8):

$$\left. \begin{array}{l} C_1 = \{(\epsilon \cdot A)/(d - \Delta d)\} + C_{s1} \\ C_2 = \{(\epsilon \cdot A)/(d + \Delta d)\} + C_{s2} \end{array} \right\} \quad (8)$$

where A represents the area of the electrode of each of the capacitor elements 9 and 10, d the distance between the movable and fixed electrodes of each capacitor element when the movable electrode is in the reference position, $\Delta d$ a displacement of the movable electrode, $C_{s1}$ and $C_{s2}$ stray capacitances with respect to the capacitor elements 9 and 10, and $\epsilon$ the dielectric constant of the medium existing between the movable and fixed electrodes.

Since in the arrangement of FIG. 1, $C_{s1} = C_{s2} = C_s$, and the value of the electrostatic capacitance of the third capacitor element 11 is set such that $C_3 = 2C_s$, the following expression 9 can be derived from expressions (7) and (8):

$$V_o = I_2 \cdot R_3 + (R_3 + R_4) \cdot (R/R_3) \cdot I_k \cdot (\Delta d/d) \approx \frac{1}{2} \cdot I_k \cdot R_3 \cdot \quad (9)$$

$$\left(1 + \frac{C_s}{C_o}\right) + I_k \cdot \left\{\frac{R}{R_3} \cdot (R_3 + R_4) - \frac{R_3}{2}\right\} \cdot (\Delta d/d)$$

$$C_o = (\epsilon \cdot A)/d$$

The value $C_s$ is generally much smaller than the value $C_o$. Accordingly, as is apparent from expression (9), the value of the output voltage $V_o$ is proportional to the mechanical displacement ($\Delta d/d$) of the movable electrode constituting each of the capacitor elements 9 and 10. In that case, in the displacement converting device 1, the mechanical displacement (Δd/d) is converted into the voltage $V_o$ with little bad influence by the stray capacity $C_s$ of the respective capacitor elements 9 and 10, and the span adjustment at this time can be easily performed by adjusting the resistance value $R_4$ of the fourth resistor 39. The zero point adjustment of the above-mentioned displacement converting operation can be easily performed by the variable resistor 37. Further, since the displacement is converted into an output in the form of a voltage in the converting device of FIG. 1 as described above, the operation requires small power consumption.

Figure 2:
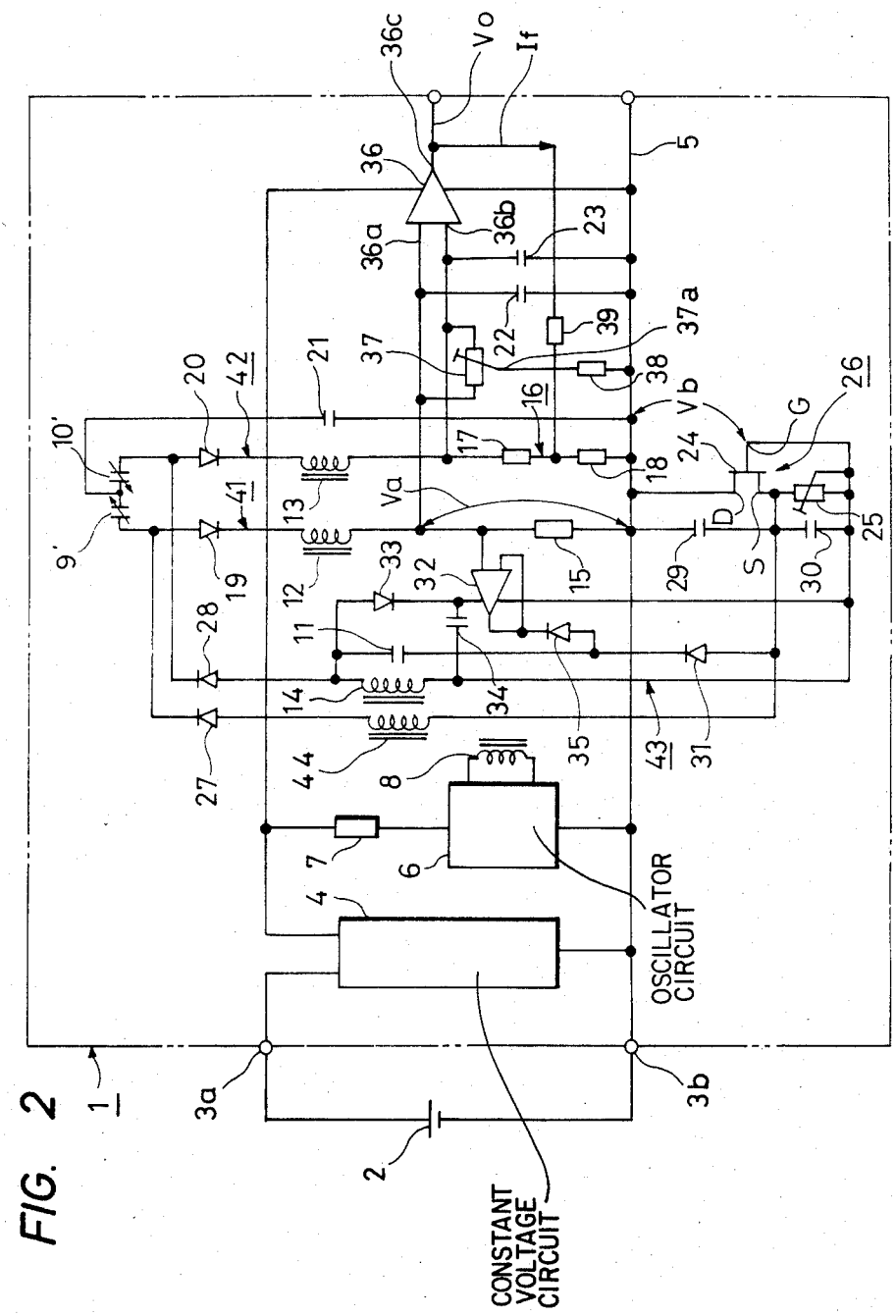
FIG. 2 is a circuit diagram of a second embodiment of the displacement converting device of the present invention.

FIG. 2 illustrates a second embodiment of the displacement converting device of the present invention. In FIG. 2, the same reference numerals as used in FIG. 1 are used to refer to like elements. Description of the interconnection and function of elements in the embodiment of FIG. 2 that are the same as the elements in the embodiment of FIG. 1 has been omitted for the sake of brevity.

In the embodiment of FIG. 2, a first capacitor element is provided with opposite electrodes each having an area A facing each other and separated by a distance d. A second capacitor element for detecting a pressure, or the like, is provided such that the distance between the opposite electrodes of the second capacitor element is caused to be changed by the pressure through a not-shown mechanism. Each of the opposite electrodes of the second capacitor elements has an area facing the other electrode and the distance d separates the opposite electrodes of the second capacitor element when no pressure, or the like, is exerted thereon. That is, the second element 10' has an electrostatic capacity which changes corresponding to a mechanical displacement that changes the distance between the opposite electrodes thereof.

A third capacitor element is provided in which an electrostatic capacity is set by a method described later. Secondary coils 12, 13, 14, and 44 are individually coupled with the primary coil 8 for generating AC voltages of amplitudes equal to each other.

A field effect transistor 24 having a drain D and connected to the reference potential portion 5 and a source 5 connected to a current regulating variable resistor 25. The gate G of the transistor 24 is connected to the source S through the variable resistor 25 as well as to one side of the secondary coil 14 which is in turn connected at its other end to the anode of the diode 20 through a diode 28.

The diodes 20 and 28 are forwardly connected. The secondary coil 44 is connected at its one end to the source S and at its other end to the anode of diode 27 which is in turn forwardly connected to the diode 19. The reference numerals 29 and 30 designate smoothing capacitors. A diode 31 is provided with its anode connected to the source of the transistor 24, and the third capacitor element 11 is connected between the cathode of the diode 31 and the anode of the diode 28.

In the displacement converting device 1 of FIG. 2, and AC voltage is induced in each of the secondary coils 12, 13, and 14 when the DC supply 2 is connected to the device 1. The secondary coils 12, 13, and 14 are arranged such that the respective polarities of the induced voltages are directed in the same direction at the same time. Therefore, during the period of a positive half-wave in which the voltage induced in the same direction at the same time. Therefore, during the period of a positive half-wave in which the voltage reduced in the secondary coil 12 is directed downwardly in FIG. 2, the current due to this voltage flows successively through the secondary coil 12, a parallel circuit composed of the first resistor 15 and the capacitor 21, the coupling capacitor 21, the first capacitor element 9, and the diode 19. During the period of the same positive half-wave, the current due to the voltage induced in the secondary coil 13 flows successively through the secondary coil 13, a parallel circuit composed of the series circuit 16 and the capacitor 23, the coupling capacitor 21, the second capacitor element 10, and the diode 20.

During the period of the next half-wave following the above-mentioned positive half-wave, that is in the period of a negative half-wave in which the voltage induced in the secondary coil 44 is directed upwardly, the current due to this voltage passes successively through the secondary coil 44, the diode 27, the first capacitor element 9', the coupling capacitor 21, a parallel circuit constituted by the transistor 24 and the capacitor 29, and comes back to the secondary coil 44. The current due to the voltage induced in the secondary coil 14 in the same negative half-wave period flows successively through the secondary coil 14, the diode 28, the second capacitor element 10', the coupling capacitor 21, a parallel circuit of the transistor 24 and the capacitor 29, and a parallel circuit of the variable resistor 25 and the capacitor 30.

When the voltage induced in the secondary coil 12 becomes directed downwardly, the current flowing through the first capacitor element 9 due to this voltage is rectified in the first resistor 15 by the smoothing capacitor 22, so that a voltage drop is generated across the resistor 15 due to this DC current. At the same time, the current flowing through the second capacitor element 10 due to the voltage induced in the secondary coil 13 is rectified by the smoothing capacitor 23 in the series circuit 16, so that a voltage drop is generated across the opposite terminals of the series circuit 16. When the voltage induced in the secondary coil 14 becomes directed upwardly, the currents caused to flow through the first and the second capacitor elements 9 and 10 by the voltage generates a potential difference $V_b$ between the drain D and the gate G of the transistor 24 owing to the existence of the smoothing capacitors 29 and 30.

When the voltage induced in the secondary coil 14 is directed downwardly, the current due to this voltage flows successively through the coil 14, a parallel circuit composed of the variable resistor 25 and the capacitor 30, the diode 31, and the third capacitor element 11. When the voltage induced in the secondary coil 14 is directed upwardly, this current due to the voltage flows successively through the coil 14, the third capacitor element 11, the diode 35, the buffer amplifier 32, and a junction between the variable resistor 25 and the gate G of the transistor 27. Therefore, a current which is the sum of the respective currents flowing through the second capacitor element 10' from the secondary coil 44 flows downwardly, and the current flowing through the third capacitor element 11 from the secondary coil 14 flows upwardly. Since the variable resistor 25 and the transistor 24 are connected with each other in the manner as described above, the composite current which is the sum of the upwardly and downwardly flowing currents is automatically controlled to be a predetermined value by the transistor 24. As a result the potential difference $V_b$ becomes a predetermined value.

In the control circuit 26 constituted by the transistor 24 and the variable resistor 25, the composite current flowing through the variable resistor 25 can be changed by changing the resistance value of the variable resistor 25. Therefore, the composite current that is the downwardly flowing current can be determined by adjusting the variable resistor 25 to a desired value, so that the current consumption in the circuit is within an allowable value of the power supply 2.

As described with respect to FIG. 1, the output and input terminals of the operational amplifier 36 are connected, so that if the voltage applied to the first input terminal 36a is different from that applied to the second input terminal 36b, a feedback current $I_f$ from the output terminal 36c flows into the reference potential portion 5 successively through the fourth resistor 39 and the third resistor 18. As a result, when the voltages respectively applied to the input terminals 36a and 36b are equal with each other, the output voltage produced at the output terminal 36c becomes $V_o$ in its equilibrium state.

The AC voltages are applied to the first and second capacitor elements 9' and 10' through the period of one cycle of the AC voltage of multi-amplitudes E induced across each of the secondary coils 12, 13, 14, and 44. The multi-amplitudes of the applied AC voltages are $E-(V_a+V_{ds})$ and $E-(V_a+V_b)$ at the elements 9' and 10', respectively, if the voltage drop across the coupling capacitor 21 is neglected.

In the above expressions, $V_{ds}$ represents the voltage across the drain and source of the transistor 24.

$V_b$ is represented by $(V_{ds}+V_{sg})$ where $V_{sg}$ is the voltage across the source and gate of the transistor 24. In FIG. 2, $V_{sg}$ is determined to be smaller than $V_{ds}$ resulting in $V_b=V_{ds}$, and therefore the multi-amplitudes of the AC voltage applied to the capacitor element 9' is considered to be equal to $E-(V_a+V_b)$ and is similar to that applied to the capacitor 10'. An AC voltage induced in the secondary coil is 14 applied to the third capacitor element 11. The multi-amplitudes of the AC voltage are expressed by $E-(V_a+V_b-V_{sg})=E-(V_a+V_{ds})$. Accordingly, the multi-amplitudes of the AC voltage applied to the capacitor element 11 is also considered to be equal to $E-(V_a+V_b)$. Accordingly, DC currents $I_1$, $I_2$, and $I_3$ flowing through the first resistor 15, the series circuit 16, and the variable resistor 25 are expressed by the following expressions.

$$\left. \begin{array}{l} I_1 = f \cdot [E - (V_a + V_b)] \cdot C_1 \\ I_2 = f \cdot [E - (V_a + V_b)] \cdot C_2 \\ I_3 = f \cdot [E - (V_a + V_b)] \cdot C_3 \end{array} \right\} \quad (1)$$

where f represents the frequency of the voltage induced in the secondary coils 12, 13, 14 and 44, and $C_1$, $C_2$, and $C_3$ represent the electrostatic capacities of the first, second, and third capacitor elements 9', 10', and 11, respectively.

The DC current flowing through the first resistor 15 is a first DC current having the magnitude $I_1$ proportional to the electrostatic capacity $C_1$ of the first capacitor element 9', and the DC current flowing through the series circuit 16 is a second DC current having the magnitude $I_2$ proportional to the electrostatic capacity $C_2$ of the second capacitor element 10'. The first and a second current circuits 41, 42 driven by the AC voltages induced in the secondary coils 12, 13, and 14 produce the first and second DC currents as described above, and the DC current flowing upwardly through the variable resistor 25 is the third DC current having the magnitude proportional to the electrostatic capacity $C_3$ of the third capacitor element 11. The current caused to flow into the transistor 25 by the secondary coils 14 and 44 is equal to the discharge current of the first and second capacitor element 9' and 10' charged by the currents $I_1$ and $I_2$. The component corresponding to the current $I_1$ flows from the transistor 24 into the secondary coil 44, while the components corresponding to the current $I_2$ flows into the secondary coil 14 through the variable resistor 25, so that the magnitude of the current flowing through the variable resistor 25 is $I_2-I_3$ because the current $I_3$ flows upwardly in the variable resistor 26. The control circuit 26 controls the value $I_2-I_3$ to be a constant value $I_k$ as described above. The following expression (2) is satisfied and the following expression (3) can be derived from the expressions (1) and (2).

$$I_2 - I_3 = I_k \quad (2)$$

$$\left. \begin{array}{l} I_1 = I_k \cdot [C_1/(C_2 - C_3)] \\ I_2 = I_k \cdot [C_2/(C_2 - C_3)] \end{array} \right\} \quad (3)$$

Since the output voltage $V_o$ of the operational amplifier 36 assumes the equilibrium state under the condition of input/output voltages as described above, the following expressions (4) and (5) are established as stated above.

$$V_o = I_2 R_3 + I_f(R_3 + R_4) \quad (4)$$

$$I_1 \cdot R_1 = I_2 \cdot (R_2 + R_3) + I_f R_3 \quad (5)$$

where $R_1$, $R_2$, $R_3$, and $R_4$ represent the resistance values of the first, the second, the third, and the fourth resistors 15, 17, 18, and 39, respectively.

Again as previously stated, the following expression (6) is derived from the expressions (4) and (5) and the expression (7)' is derived from the expressions (6) and (3).

$$V_o = I_2 \cdot R_3 + (R_3 + R_4) \cdot (R/R_3) \cdot (I_1 - I_2) \quad (6)$$

$$V_o = I_2 \cdot R_3 + (R_3 + R_4) \cdot (R/R_3) \cdot I_k \cdot \frac{C_1 - C_2}{C_2 - C_3} \quad (7)'$$

As described above, in each of the capacitor elements 9' and 10', the opposite electrodes have facing areas A and are separated by a distance d which can be changed by pressure, or the like. Accordingly, the electrostatic capacitances $C_1$ and $C_2$ can be expressed by the expressions (8)'.

$$\left. \begin{array}{l} C_1 = [(\epsilon \cdot A)/d] + C_{s1} \\ C_2 = [(\epsilon \cdot A)/(d + \Delta d)] + C_{s2} \end{array} \right\} \quad (8)'$$

where A represents the area of the electrode of each of the capacitor elements 9' and 10', d is a distance between the movable and fixed electrodes of each capacitor element when the movable electrode is in a reference position, $\Delta d$ is a displacement of the movable electrode, $C_{s1}$ and $C_{s2}$ are stray capacitances with respect to the capacitor elements 9' and 10', and $\epsilon$ is the dielectric constant of the medium existing between the movable and fixed electrodes.

Since as stated above $C_{s1}=C_{s2}=C_s$, and the value of the electrostatic capacitance of the third capacitor element 11 is set such that $C_3=2C_s$, the following expression (9)' can be derived from the expressions (7)' and (8)':

$$V_o = I_2 \cdot R_3 + (R_3 + R_4) \cdot (R/R_3) \cdot I_k \cdot (\Delta d/d) \approx \frac{1}{2} \cdot I_k \cdot R_3 \cdot$$

$$\left(1 + \frac{C_s}{C_o}\right) + I_k \cdot \left[\frac{R}{R_3} \cdot (R_3 + R_4) - \frac{R_3}{2}\right] \cdot (\Delta d/d)$$

$$C_o = (\epsilon \cdot A)/d$$

The value of $C_3$ is much smaller than $C_2$ because $C_3$ is based upon a stray capacitance $C_s$. Accordingly, the relation $I_2 I_k$ can be derived from the expressions (1) and (2) and therefore the expression (9)' can be changed into the expression (10) as follows:

$$V_o \approx I_k \cdot R_3 + (R_3 + R_4) \cdot (R/R_3) \cdot I_k \cdot (\Delta d/d) \tag{10}$$

As apparent from the expression (10), the output voltage $V_o$ of the operational amplifier 36 assumes a value proportional to the mechanical displacement $(\Delta d/d)$ in the capacitor element 10'.

In the displacement converting device 1 of FIG. 2, the mechanical displacement $(\Delta d/d)$ is converted into the voltage $V_o$ with little influence of the stray capacity $C_s$ of the capacitor elements 9' and 10', and the span adjustment at this time can be easily performed by adjusting the resistance value $R_4$ of the fourth resistor 39.

What is claimed is:

1. A displacement coverting device for converting mechanical movement of a sensor or actuator mechanism to a corresponding output signal, comprising:
   a source of DC voltage
   means for producing an AC voltage from said DC voltage;
   a first capacitor;
   a second capacitor having a varable capacitance corresponding to the mechanical movement of the mechanism;
   a first current circuit connected to said producing means and to said first capacitor for producing a first current proportional to the capacitance of said first capacitor;
   a second current circuit connected to said producing means and to said second capacitor for producing a second current proportional to the capacitance of said second capacitor;
   amplifier means having a first input terminal for receiving a first signal corresponding to the magnitude of said first current, a second input terminal for receiving a second signal corresponding to the magnitude of said second current, and an output terminal, said amplifier means for comparing said first signal to said second signal and for generating the output signal having a magnitude corresponding to the mechanical movement of the mechanism; and
   means coupled to said amplifier means and to said first and second capacitors, for preventing stray capacitances associated with said first and second capacitors from affecting the output signal, said preventing means including a third capacitor and a buffer amplifier.

2. A displacement converting device according to claim 1, further including a source of reference potential and wherein said first current circuit includes a first resistor having a first end connected to said source of reference potential and a second end connected to said first input terminal such that said first signal corresponds to the voltage drop across said first resistor as a result of said first current flowing therethrough.

3. A displacement converting device according to claim 2, wherein said second current circuit includes a series circuit including resistive means having a first end connected to said source of reference potential and a second end connected to said second input terminal such that said second signal corresponds to the voltage drop across said resistive means as a result of said second current flowing therethrough.

4. A displacement converting device according to claim 3, wherein said resistive means includes a second resistor and a third resistor, said second resistor having a first end connected to said second input terminal and a second end, said third resistor having a first end connected to said second end of said second resistor and a second end connected to said source of reference potential.

5. A displacement converting device according to claim 4, further including a control circuit including a current regulator for controlling said second current to have a magnitude within a selected range.

6. A displacement converting device according to claim 5, further including a fourth resistor connected between said output terminal of said amplifier means and said first end of said third resistor.

7. A displacement converting device according to claim 1, wherein said first capacitor has a variable capacitance and wherein the capacitances of said first resistor and said second resistor vary differentially with respect to each other corresponding to the mechanical movement of the mechanism.

8. A displacement converting device according to claim 7, further including a source of reference potential and wherein said first current circuit includes a first resistor having a first end connected to said source of reference potential and a second end connected to said first input terminal such that said first signal corresponds to the voltage drop across said first resistor as a result of said first current flowing therethrough.

9. A displacement converting device according to claim 8, wherein said second current circuit includes a series circuit including resistive means having a first end connected to said source of reference potential and a second end connected to said second input terminal such that said second signal corresponds to the voltage drop across said resistive means as a result of said second current flowing therethrough.

10. A displacement converting device according to claim 9, wherein said resistive means includes a second resistor and a third resistor, said second resistor having a first end connected to said second input terminal and a second end, said third resistor having a first end connected to said second end of said second resistor and a second end connected to said source of reference potential.

11. A displacement converting device according to claim 10, further including a control circuit including a current regulator for controlling a composite current corresponding to the sum of said first current and said second current to have a magnitude within a selected range.

12. A displacement converting device according to claim 11, further including a fourth resistor connected between said output terminal of said amplifier means and said first end of said third resistor.

13. A displacement converting device for converting mechanical movement of a sensor or actuator mechanism to a corresponding output signal, comprising:
- a voltage circuit for producing a constant DC voltage;
- an oscillation circuit driven by said DC voltage to produce an AC voltage;
- first and second variable capacitors, the respective electrostatic capacitances of said first and second capacitors changing differentially with respect to each other and according to the mechanical movement of the mechanism;
- a first current circuit driven by said AC voltage to produce a first DC current proportional to said electrostatic capacitance of said first capacitor;
- a second current circuit driven by said AC voltage to produce a second DC current proportional to said electrostatic capacitance of said second capacitor;
- a control circuit including a current regulator for controlling a composite current corresponding to the sum of the first and second DC current proportional to said electrostatic capacitance of said second capacitor;
- a control circuit including a current regulator for controlling a composite current corresponding to the sum of the first and second DC currents to have a magnitude within a preselected range;
- a source of reference potential;
- a first resistor included in said first current circuit and having a first end connected to said source of reference potential and a second end, said first current flowing through said first resistor to produce a first voltage drop;
- a series circuit included in said second current circuit and having a second resistor and a third resistor, said second resistor having a first end and a second end and said third resistor having a first end connected to said second end of said second resistor and a second end connected to said source of reference potential, said second current flowing through said series circuit to produce a second voltage drop;
- an operational amplifier driven by said constant DC voltage and having a first input terminal connected to said second end of said first resistor, a second input terminal connected to said first end of said third resistor, and an output terminal, said operational amplifier for comparing said first voltage drop to said second voltage drop and for outputting on said output terminal the output signal corresponding to the movement of the mechanism;
- a fourth resistor having a first end connected to said output terminal and a second end connected to said first end of said third resistor; and
- means coupled to said operational amplifier and to said first and second capacitors, for preventing stray capacitances associated with said first and second capacitors from affecting the output signal, said preventing means including a third capacitor and a buffer amplifier.

14. A displacement converting device for converting mechanical movement of a sensor or actuator mechanism to a corresponding output signal, comprising:
- a voltage circuit for producing a constant DC voltage;
- an oscillator driven by said DC voltage to produce an AC voltage;
- a first capacitor having a reference electrostatic capacitance;
- a second capacitor having a variable electrostatic capacitance corresponding to the mechanical movement of the mechanism;
- a first current circuit driven by said AC voltage to produce a first DC current proportional to said electrostatic capacitance of said first capacitor;
- a second current circuit driven by said AC voltage to produce a second DC current proportional to said electrostatic capacitance of said second capacitor;
- a control circuit including a current regulator for controlling said second DC current to have a magnitude within a preselected range;
- a source of reference potential;
- a first resistor included in said first current circuit and having a first end connected to said source of reference potential and a second end, said first current flowing through said first resistor to produce a first voltage drop;
- a series circuit included in said second current circuit and having a second resistor and a third resistor, said second resistor having a first end and a second end and said third resistor having a first end connected to said second end of said second resistor and a second end connected to said source of reference potential, said second current flowing through said series circuit to produce a second voltage drop;
- an operational amplifier driven by said constant DC voltage and having a first input terminal connected to said second end of said first resistor, and second input terminal connected to said first end of said third resistor, and an output terminal, said operational amplifier for comparing said first voltage drop to said second voltage drop and for outputting on said output terminal the output signal corresponding to the movement of the mechanism;
- a fourth resistor having a first end conneted to said output terminal and a second end connected to said first end of of said third resistor; and
- means coupled to said operational amplifier and to said first and second capacitors, for preventing stray capacitances associated with said first and second capacitors from affecting the output signal, said preventing means including a third capacitor and a buffer amplifier.

* * * * *